(12) United States Patent
Varekamp et al.

(10) Patent No.: US 10,607,351 B2
(45) Date of Patent: Mar. 31, 2020

(54) METHOD AND APPARATUS FOR DETERMINING A DEPTH MAP FOR AN IMAGE

(71) Applicant: KONINKLIJKE PHILIPS N.V., Eindhoven (NL)

(72) Inventors: Christiaan Varekamp, Eindhoven (NL); Patrick Luc Els Vandewalle, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 173 days.

(21) Appl. No.: 15/741,403

(22) PCT Filed: Jul. 12, 2016

(86) PCT No.: PCT/EP2016/066513
§ 371 (c)(1),
(2) Date: Jan. 2, 2018

(87) PCT Pub. No.: WO2017/009324
PCT Pub. Date: Jan. 19, 2017

(65) Prior Publication Data
US 2018/0374227 A1 Dec. 27, 2018

(30) Foreign Application Priority Data
Jul. 13, 2015 (EP) ..................... 15176418

(51) Int. Cl.
*G06T 7/521* (2017.01)
*G01S 17/89* (2020.01)
(Continued)

(52) U.S. Cl.
CPC .............. *G06T 7/521* (2017.01); *G01B 11/25* (2013.01); *G01S 17/023* (2013.01); *G01S 17/89* (2013.01);
(Continued)

(58) Field of Classification Search
None
See application file for complete search history.

(56) References Cited

U.S. PATENT DOCUMENTS

2014/0028804 A1* 1/2014 Usuda ............... G01S 17/023
348/47
2014/0291480 A1 10/2014 Bruder et al.
(Continued)

FOREIGN PATENT DOCUMENTS

EP         2005886 A1 * 12/2008  ........... A61B 5/0059

OTHER PUBLICATIONS

Zhang, Z., "Microsoft Kinect Sensor and Its Effect" IEEE Multimedia, vol. 19, No. 2, pp. 4-10 (2012).
Burak Gokturk, "A Time of Flight Depth Sensor—System Description Issues and Solutions" IEEE Computer Vision and Pattern Recognition Workshop 2014.
(Continued)

*Primary Examiner* — Fayyaz Alam

(57) ABSTRACT

An apparatus for determining a depth map for an image of a scene comprises an active depth sensor (103) and a passive depth sensor (105) for determining a depth map for the image. The apparatus further comprises a light determiner (109) which determines a light indication indicative of a light characteristic for the scene. The light indication may specifically reflect a level of visible and/or infrared light for the scene. A depth map processor (107) determines an output depth map for the image by combining the first depth map and the second depth map. Specifically, a depth value for the output depth map is determined as a combination of depth values of the first and the second depth map where the combining is dependent on the light indication. The light determiner (109) estimates the first infrared light indication from a visible light indication indicative of a light level in a frequency band of the visible light spectrum.

20 Claims, 2 Drawing Sheets

(51) Int. Cl.
 *G01S 17/02* (2020.01)
 *G01B 11/25* (2006.01)
 *G06T 7/55* (2017.01)
 *G06T 7/586* (2017.01)
 *G01S 17/46* (2006.01)
 *G01S 17/08* (2006.01)

(52) U.S. Cl.
 CPC ............... *G06T 7/55* (2017.01); *G06T 7/586* (2017.01); *G01S 17/08* (2013.01); *G01S 17/46* (2013.01); *G06T 2207/10012* (2013.01); *G06T 2207/10028* (2013.01); *G06T 2207/10048* (2013.01)

(56) References Cited

U.S. PATENT DOCUMENTS

2015/0049169 A1  2/2015  Krig et al.
2015/0178936 A1  6/2015  Boisson et al.
2016/0269714 A1* 9/2016  Rhemann ........... G06K 9/00892

OTHER PUBLICATIONS

Zhu et al "Reliability Fusion of Time of Fligth Depth and Stereo Geometry for High Quality Depth Maps" IEEE Transactions on Pattern Analysis and Machine Intelligence, vol. 33, No. 7, Jul. 1, 2011 p. 1400-1414.

Zhang et al "High Quality Depth Maps From Stereo Matching and TOF Camera" Soft Computing and Pattern Recognition, 2011 International Conference of IEEE, Oct. 14, 2011 p. 68-72.

Yang et al "Fusion of Active and Passive Sensors for Fast 3D Capture" 2010 IEEE International Workshop on Multimedia Signal Processing, Oct. 4, 2010, p. 69-74.

Lee et al "High Resolution Depth Map Generation by Applying Stereo Matching Based on Initial Depth Information" 2008 IEEE, 3DTV-CON. p. 201-204.

Garcia "Pixel Weighted Average Strategy for Depth Sensor Data Fusion" University of Luxenbourg, 2010 International Conference on Image Processing, Sep. 26-29, 2010.

Chang et al "Real-Time Hybrid Stereo Vision System for HD Resolution Disparity Map" Sep. 2014, British Machine Vision Conference.

* cited by examiner

METHOD AND APPARATUS FOR DETERMINING A DEPTH MAP FOR AN IMAGE

CROSS-REFERENCE TO PRIOR APPLICATIONS

This application is the U.S. National Phase application under 35 U.S.C. § 371 of International Application No. PCT/EP2016/066513, filed on Jul. 12, 2016, which claims the benefit of EP Patent Application No. EP 15176418.0, filed on Jul. 13, 2015. These applications are hereby incorporated by reference herein.

FIELD OF THE INVENTION

The invention relates to a method and apparatus for determining a depth map for an image, and in particular to determining a depth map based on a plurality of depth sensors.

BACKGROUND OF THE INVENTION

Three dimensional image rendering and processing has become increasingly prevalent in recent years. This is to a large extent due to the development of three dimensional (3D) displays which add a third dimension to the viewing experience by providing a viewer's two eyes with different views of the scene being watched. This can be achieved by having the user wear glasses to separate two views that are displayed. However, as this may be considered inconvenient to the user, it is in many scenarios preferred to use autostereoscopic displays that use means at the display (such as lenticular lenses, or barriers) to separate views, and to send them in different directions where they individually may reach the user's eyes. For stereo displays, two views are required whereas autostereoscopic displays typically require more views (such as e.g. nine views).

The quality of the presented three dimensional image depends on the quality of the received image data, and specifically the three dimensional perception depends on the quality of the received depth information.

Three dimensional image information is often provided by a plurality of images corresponding to different view directions for the scene. Specifically, video content, such as films or television programs, are increasingly generated to include some 3D information. Such information can be captured using dedicated 3D cameras that capture two simultaneous images from slightly offset camera positions.

However, in many applications, the provided images may not directly correspond to the desired directions, or more images may be required. For example, for autostereoscopic displays, more than two images are required and indeed often 9-26 view images are used.

In order to generate images corresponding to different view directions, view point shifting processing may be employed. This is typically performed by a view shifting algorithm that uses an image for a single view direction together with associated depth information. However, in order to generate new view images without significant artefacts, the provided depth information must be sufficiently accurate.

Unfortunately, in many applications and use scenarios, the depth information may not be as accurate as desired.

Whereas three dimensional imaging based on conventional two dimensional images may be possible using various depth estimation techniques, these tend to be complex and inaccurate and often require substantial human input. However, increasingly when content is captured, depth information is also being captured. For example, when filming or video recording a scene, depth is also recorded in order to generate a combined output reflecting both the visual image and the depth.

Such capturing of depth is typically performed using depth sensors arranged to estimate the depth characteristics of the scene. Various depth sensors are known.

An often used approach is to use a passive depth sensor in the form of stereo camera. Such a stereo camera may simply record two images corresponding to two slightly different view directions. In this way, a three dimensional scene may be captured as stereo images using two cameras at slightly different positions. Specific depth values may then be generated by estimating disparities between corresponding image objects in the two images.

Another approach is to use an active depth sensor. Specifically, active depth sensors are known which include infrared light emitters which project an infrared light pattern on the scene being recorded. An infrared camera may then capture an infrared image and detect distortions in the expected pattern. Based on these distortions, the depth sensor may generate depth information.

In yet another example, an active depth sensor may comprise a light emitter emitting infrared light in different directions. The time of arrival for reflected light in the different directions may be detected and used to derive depth information.

However, although such depth sensors may often improve the quality of the generated depth information compared to estimation based on a single two-dimensional image, they tend to also have suboptimal performance. Typically, the generated depth information is not optimal in all scenarios and e.g. generated depth maps may comprise some inaccurate or erroneous depth values. This may again result in artefacts and a degraded three dimensional image quality when image processing or rendering is performed based on this depth information.

Further, improving the depth estimates may often necessitate dedicated and specifically modified depth sensors to be used. However, this is inflexible and increases cost in comparison to the use of standard or off-the-shelf depth sensors.

Accordingly, an improved approach for determining suitable depth would be advantageous and in particular an approach allowing increased flexibility, facilitated implementation, reduced complexity, an improved 3D experience, improved resulting perceived image quality, improved suitability for the use of standard functionality, and/or improved depth information being generated would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for determining a depth map for an image of a scene, the apparatus comprising: an active depth sensor for determining a first depth map for the image, the first depth map comprising depth values for pixels of the image determined by the active depth sensor; a passive depth sensor for determining a second depth map for the image, the second depth map comprising depth values for pixels of the image determined by the passive depth sensor; a light determiner for determining a light indication for the scene, the light indication comprising a first infrared light indication being indicative of an infrared light level for the scene; a depth map processor for determining an output depth map for the image by combining the first depth map and the second depth map, the depth map processor being arranged to determine a depth value for the output depth map as a combination of depth values of the first depth map and of the second depth map, the combining being dependent on the first infrared light indication; and wherein the light determiner is arranged to determine a visible light indication indicative of a light level in a frequency band of the visible light spectrum and to estimate the first infrared light indication from the visible light indication.

The approach may in many embodiments allow an improved depth map to be generated which when used for image processing may provide improved quality. The improvement may in particular be significant e.g. when the modified depth map is used for image view shifting and/or when presenting three dimensional images on an autostereoscopic display.

The approach may in many applications and scenarios provide more reliable and/or accurate depth values to be generated. In particular, the inventors have realized that active and passive depth sensors may exhibit complementary performance and that the combination of depth values generated by the different types of sensors and depth sensing may provide improved depth values. In particular, the inventors have realized that using an infrared light indication indicative of a light characteristic for the scene to control the combination may allow complementary behavior and characteristics of the different types of depth sensors to be exploited to provide improved depth values and/or to allow depth values to be generated for a wider range of applications and scene environments.

Further, the approach may allow facilitated implementation in many embodiments and may in particular in many embodiments allow standard or off-the-shelf depth sensors to be used. The approach may for example allow an infrared light indication to be determined which may sufficiently accurately reflect e.g. ambient infrared light rather than e.g. infrared light transmitted from the apparatus (or elsewhere) for the purpose of making the active depth sensing. For example, the approach may in many embodiments allow an ambient infrared light indication to be generated without requiring any additional or dedicated equipment. Specifically, in many embodiments, this may be achieved without requiring dedicated infrared measurement functionality and while allowing a standard depths sensor which does not provide any ambient light indication to be used.

The infrared light indication may specifically be an ambient infrared light indication. This indication may be indicative of a level of infrared light incident on the apparatus (on at least one of the sensors) when no infrared light is emitted for the purpose of active depth determination.

The visible light indication may be indicative of an infrared light characteristic for the scene, such as an infrared light level. The infrared light indication may specifically be an ambient infrared light indication indicative of a characteristic of ambient infrared light. Ambient infrared light may specifically correspond to infrared light not resulting from light emission from a light emitter of the active depth sensor.

In many scenarios, an ambient light indication may be a particularly good indicator of the relative performance of a passive and active depth sensor. For example, it may reflect a likely signal to noise ratio and thus reliability for the active depth sensor.

In many embodiments, the light determiner may estimate an ambient infrared light level in response to a measured light level as detected by the visible light camera.

In many embodiments, the light determiner may be arranged to estimate the infrared light indication from image data from the visible light camera and from a capture duration of the visible light camera.

The visible light indication may specifically be indicative of a light level in the frequency band of the visible light spectrum.

The maps may be full or partial maps. For example, the first and or second depth map may comprise depth values for only a subset of pixels of the image. In some embodiments, each of the first and second depth maps may comprise a depth value for each pixel of the image. Some or all of the depth values may e.g. be shared between multiple pixels. For example, the pixels of the image may be divided into e.g. 4×4 or 8×8 pixel groups and one depth value may be provided for each group in the depth maps. The depth maps may have the same or different resolutions. Each of the depth maps may have the same or a different resolution than the resolution of the image.

The depth values comprised in the depth maps may be any suitable representation of depth, such as specifically a depth coordinate (z) value or a disparity value representing shifts between images of different view directions.

The depth values of the combination may specifically include or consist of depth values being co-located with respect to a common coordinate system/for a common view direction. The depth value(s) being combined (or at least some of them) may specifically be co-located with the output data value with respect to a common coordinate system. Specifically, a first output depth value may in many embodiments be generated in response to (or as) a combination of a first depth value from the first depth map and a second depth value from the second depth map, the output depth value, the first depth value and the second depth value having corresponding positions (or being co-located) with reference to a common coordinate system/common view direction. The positions of the co-located output depth value, first depth value and second depth value may in the depth maps relate to different positions if the depth maps are for different view directions. However, the depth values may have corresponding positions for a common view direction, and specifically they may be co-located in the sense that if their positions were transformed to the common coordinate system, they would correspond to the same position. The common coordinate system may specifically be the coordinate system/view direction of the output depth map and/or of the image.

In some embodiments, the combination may be a selection combination. Thus, in some embodiments, the depth map processor may be arranged to generate the depth value for the output depth map by selecting between a (co-located) depth value of the first depth map and a (co-located) depth value of the of the second depth map in response to/dependent on the light indication.

The active depth sensor may comprise a light emitter emitting infrared light having a characteristic used by the active depth sensor to determine the depth values for the first depth map. The characteristic may specifically be a spatial characteristic and the active depth sensor may be arranged to determine the depth values for the first depth map based on the spatial characteristic. The active depth sensor may be arranged to determine the depth values for the first depth map based on an assumption of the scene being illuminated by a light having a predetermined (typically) spatial characteristic. The active depth sensor may be arranged to determine the first depth map in response to a sensing of an infrared light signal. The active depth sensor may specifically determine the first depth map in response to a property of captured infrared light in comparison to a property of emitted infrared light. For example, the property may be a spatial pattern or a time property.

The passive sensor may be arranged to determine the depth values for the second depth map without any assumption of a predetermined spatial and/or predetermined characteristic of light illuminating the scene. The passive depth sensor may not comprise any light emitter. The passive depth sensor may be arranged to determine the depth values for the second depth map based only on ambient light.

The light indication may accordingly in many embodiments be indicative of an infrared light level for the scene. The light indication may be a composite indication comprising multiple indications, and specifically the light indication may be formed by a plurality of values with each value being indicative of a different light characteristic, such as e.g. light levels in different frequency bands. As a specific example, the light indication may comprise a visible light indication indicative of a degree or level of visible light for the scene, and an infrared light indication indicative of a degree or level of infrared light for the scene.

The combination may comprise determining the depth value for the output depth map in response to a weighted combination of depth values of the first depth map and of the second depth map, the weight for at least one of the depth values being dependent on the first infrared light indication.

This may provide an improved depth map in many embodiments and scenarios. In particular, it may provide a more gradual weighting of the depths generated by the different types of depth sensors resulting in a more accurate depth value in many embodiments.

In some embodiments, the active depth sensor may comprise an infrared light emitter and may be arranged to generate the depth values for the first depth map in response to measurements of infrared light, and the passive depth sensor may comprise at least one visible light camera and may be arranged to generate the depth values for the second depth map in response to measurements of visible light.

This may allow improved depth values to be generated in many embodiments, and/or may allow depth information to be (automatically) generated over a larger range of applications and scenarios. In particular, the approach may exploit complementary behavior and characteristics of infrared based active depth sensors and depth sensors based on capturing images in the visible light frequency range.

In some embodiments, the at least one visible light camera may comprise a plurality of light cameras at different view directions. Specifically, the passive depth sensor may include a stereo camera. In such embodiments, the passive depth sensor may be arranged to determine depth values in response to a disparity estimation between images captured by cameras with different view directions.

In some embodiments, the light indication may further comprise the visible light indication, and the combination may be in response to the visible light indication.

This may provide improved depth values in many embodiments and scenarios. The frequency band may e.g. correspond to the full visible frequency range (or may include this), or may e.g. be only a subset of the full visible frequency range.

In many embodiments, a weighting of depth levels of the second depth map is increased for the visible light being indicative of an increasing level of light.

The visible light indication may be indicative of a visible light characteristic for the scene, such as a visible light level.

In many scenarios, a visible light indication may be a particularly good indicator of the relative performance of a passive and active depth sensor.

In accordance with an optional feature of the invention, the first infrared light indication is an ambient infrared light indication indicative of a level of infrared light when no infrared light is emitted by the apparatus.

This may provide improved operation and/or performance in many embodiments. It may for example, allow the system to adapt the generation of the depth map to more accurately reflect the relatively performance of the active depth sensor. For example, it may allow estimation and consideration of interference conditions when performing active depth sensing.

In accordance with an optional feature of the invention, the light determiner is arranged to generate the visible light indication based on data from the visible light camera.

This may allow improved performance in many embodiments and/or may reduce complexity. It may in many systems allow local light indications to be generated thereby allowing a more efficient and locally optimized generation of depth values.

In accordance with an optional feature of the invention, the data comprises an image capture duration.

This may allow improved performance in many embodiments and/or may reduce complexity. It may in many systems allow local light indications to be generated thereby allowing a more efficient and locally optimized generation of depth values.

The image capture time may specifically be a shutter time for the camera, and may correspond to the integration time in which light is collected by the light recording element (e.g. CCD) of the camera.

In accordance with an optional feature of the invention, the data comprises an image captured by the visible light camera and the light determiner is arranged to determine the visible light indication in response to image data values.

This may allow improved performance in many embodiments and/or may reduce complexity. It may in many systems allow local light indications to be generated thereby allowing a more efficient and locally optimized generation of depth values. The approach may e.g. allow the visible light indication to reflect the light level for each individual pixel thereby allowing the combination to be optimized on a pixel by pixel basis. The approach may further allow an improved infrared light indication to be generated as this may be based on an improved visible light indication.

In some embodiments, the light determiner is arranged to determine the visible light indication in response to the image data values and the image capture duration.

In some embodiments, the visible light indication comprises different values for different regions of the image, and the light determiner may be arranged to generate a visible light indication for a first region of the image in response to image data values of the image captured by the visible light camera in a region corresponding to the first region. Similarly, the infrared light indication may be generated for individual regions as it may be based on visible light indications which differ between different regions.

This may allow the light indication to reflect local characteristics for the image and depth map, and accordingly may allow for a local optimization of the generation of depth values. The approach may e.g. allow the visible light indication to reflect the light level for each individual pixel thereby allowing the combination to be optimized on a pixel by pixel basis.

In accordance with an optional feature of the invention, the light indication comprises a second infrared light indication determined in response to a light measurement in a frequency band of the infrared light spectrum.

This may provide improved depth values in many embodiments and scenarios. The frequency band may e.g. correspond to the infrared frequency range (or may include this), or may e.g. be only a subset of the infrared frequency range. In particular, the combination of a directly measured and an estimated infrared light level may allow an improved estimation of the reliability and accuracy of the determined depth values for the first depth map.

In accordance with an optional feature of the invention, the second infrared light indication is indicative of an infrared light level when the scene is illuminated to perform depth determination by the active depth sensor.

This may provide improved depth values in many embodiments and scenarios. In particular, it may allow a more accurate estimation of the reliability of the active depth determination.

In accordance with an optional feature of the invention, the first infrared light indication is indicative of an infrared light level when the scene is not illuminated to perform depth determination by the active depth sensor.

This may provide improved depth values in many embodiments and scenarios. In particular, the combination of an infrared light level being indicative of an ambient light level (when no light is emitted) and a light indication being indicative of the infrared light level when light is being emitted for the purpose of active depth sensing may result in improved estimation of the performance of the active depth sensing. In particular, it may allow the effective signal to interference ratio or conditions to be estimated.

In accordance with an optional feature of the invention, the depth map processor is arranged to decrease a weighting of depth values of the first depth map relative to depth values of the second depth map for the first infrared light indication being indicative of an increasing level of infrared light, and to increase a weighting of depth values of the first depth map relative to depth values of the second depth map for the second infrared light indication being indicative of an increasing level of infrared light.

This may provide improved depth values in many embodiments and scenarios.

In accordance with an optional feature of the invention, the light indication comprises individual light indication values for different regions of the image, and the depth map processor is arranged to combine depth values for each individual region in response to a light indication value of the individual region.

This may allow local optimization of the generation of depth values. The approach may e.g. allow the visible light indication to reflect the light level for each individual pixel thereby allowing the combination to be optimized on a pixel by pixel basis.

In accordance with an optional feature of the invention, the depth map processor is arranged to increase a weighting of depth values of the second depth map relative to depth values of the first depth map for the visible light indication being indicative of an increasing level of visible light.

This may provide a more accurate and/or reliable determination in many embodiments.

In some embodiments, the depth map processor is arranged to increase a weighting of depth values of the first depth map relative to depth values of the second depth map for the visible light indication being indicative of an increasing level of infrared light.

This may provide a more accurate and/or reliable determination in many embodiments.

In some embodiments, the light determiner is arranged to estimate the infrared light indication from image data of a visible light camera of the passive depth sensor. The light determiner may be arranged to determine the infrared light indication in response to a comparison of image data of a first subset of color channels of the image captured by the visible light camera relative to image data of a second subset of color channels of the image captured by the visible light camera.

This may provide a more accurate and/or reliable determination in many embodiments. In many embodiments, the first subset may include a red color channel. In many such embodiments, the second subset may include all non-red color channels. For example, for RGB values, the first subset may comprise the R channel and the second subset may comprise the G and B color channels.

The first and second subset are different subsets and may specifically (but not necessarily) be disjoint subsets.

In some embodiments, the visible light camera comprises an infrared attenuation filter arranged to have higher infrared attenuation for at least one color channel of the second subset relative to at least one color channel of the first subset.

The infrared attenuation filter may specifically be an infrared blocking filter. This may provide a more accurate and/or reliable determination in many embodiments.

In accordance with an optional feature of the invention, the depth map processor is arranged to determine a combination weighting of depth values of the first depth map relative to depth values of the second depth map in response to both the visible light indication and the infrared light indication.

This may provide a more accurate and/or reliable determination in many embodiments.

In some embodiments, the passive depth sensor comprises a stereo camera and is arranged to determine the second depth map from a disparity estimation performed on a stereo image generated by the stereo camera, the apparatus is further arranged to determine a spatial uniformity indication for the stereo image, and the combining is dependent on the spatial uniformity.

This may provide a more accurate and/or reliable determination in many embodiments.

In some embodiments, the passive depth sensor comprises at least one visible light auto-focus camera, and the combining is further in response to an auto-focus of the visible light auto-focus camera.

This may provide a more accurate and/or reliable determination in many embodiments.

According to an aspect of the invention there is provided method of determining a depth map for an image of a scene, the method comprising: determining a first depth map for the image, the first depth map comprising depth values for pixels of the image determined by an active depth sensor; determining a second depth map for the image, the second depth map comprising depth values for pixels of the image determined by a passive depth sensor; determining a visible light indication indicative of a light level in a frequency band of the visible light spectrum; estimating an infrared light indication from the visible light indication; determining a light indication for the scene, the light indication comprising an infrared light indication being indicative of an infrared light level for the scene; determining an output depth map for the image by combining the first depth map and the second depth map, the determining of the output depth map comprising determining a depth value for the output depth map as a combination of depth values of the first depth map and of the second depth map, the combining being dependent on the light indication; and wherein determining the light indication comprises estimating the first infrared light indication from the visible light indication.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
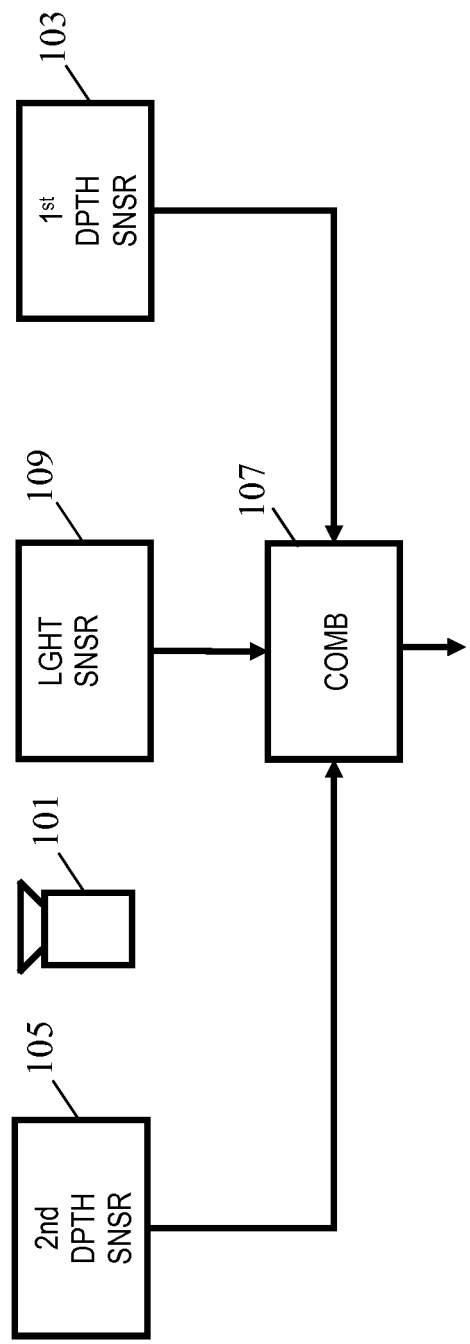
FIG. 1 is an illustration of an example of elements of an apparatus for determining a depth map in accordance with some embodiments of the invention.

FIG. 1 illustrates an example of an apparatus for determining a depth map for an image. The apparatus specifically determines a depth map for a scene which is captured in the image. The capturing of the image may specifically be by a separate conventional visible light camera 101 capturing in the same general direction as depth sensors used by the apparatus. In many embodiments, the camera and the depth sensors may be provided positioned closely together in a single enclosure. In many embodiments, the camera capturing the image may indeed also be a camera that is part of a depth sensor of the apparatus, i.e. the depth map generation may be based on data captured by the camera also capturing the image.

The apparatus of FIG. 1 comprises two depth sensors of different types. Specifically, the apparatus comprises both an active depth sensor 103 and a passive depth sensor 105.

The active depth sensor 103 is arranged to determine a first depth map for the image. The first depth map comprises depth values for pixels of the image which are determined by the active depth sensor 103. The active depth sensor 103 may thus determine depth values for a depth map where the depth maps reflect the estimated depth of the object portrayed in the image at the given pixel.

Similarly, the passive depth sensor 105 is arranged to determine a second depth map for the image. The second depth map comprises depth values for pixels of the image which are determined by the passive depth sensor 105. The passive depth sensor 105 may thus determine depth values for a depth map where the depth maps reflect the estimated depth of the object portrayed in the image at the given pixel.

The depth maps may possibly be partial maps, i.e. depth values are not necessarily provided for all pixels of the depth maps and/or the image. Further, the resolution of the depth maps may be different, and further the resolution of one or both of the depth maps may be different than the resolution of the image. Indeed, in many embodiments, the resolution of the depth maps may be lower than the resolution of the image.

An active depth sensor may perform the depth sensing based on an assumption of a specific illumination of the scene. Specifically, it may perform the depth determination based on an assumption of the scene being illuminated by a light having a characteristic (known/assumed by the active depth sensor). The depth determination may be based on detecting or estimating variations in that characteristic.

For example, the active depth sensor 103 may determine depth values in response to an assumption of the scene being illuminated by a light having a spatial characteristic. The depth may be determined by detecting spatial characteristics of light captured from the scene and comparing this to the spatial characteristics of the illuminating light.

In many embodiments, the active depth sensor 103 comprises a light emitter which emits a light having an assumed/ known spatial characteristic. The active depth sensor 103 may further comprise a light sensor for capturing light and may determine depth values in response to a comparison of spatial characteristics of the captured light relative to the assumed/known spatial characteristic.

Specifically, in the system of FIG. 1, the active depth sensor 103 is arranged to determine the depth values in response to characteristics of an infrared illumination of the scene, and thus the active depth sensor 103 performs depth estimation based on infrared light. Specifically, the apparatus, and often the active depth sensor 103 itself, may comprise an infrared light emitter which emits an infrared light pattern, such as e.g. a speckle pattern or a regular grid of light dots. The infrared light pattern will hit the objects of the scene at different distances and thus may e.g. cause a distortion in the pattern which can be detected by an infrared camera of the active depth sensor 103 and used to estimate the depth to the objects.

Active depth sensors tend to use a light source that illuminates the scene. This light source may be either spatially or temporally modulated. An example of a sensor that uses a structured light source (spatial modulation) is described in Z. Zhang, Microsoft Kinect Sensor and Its Effect, IEEE Multimedia, Vol. 19, No. 2, pp. 4-10, 2012. An example of a temporally modulated light source that uses time-of-flight to calculate depth is described in S. Burak Gokturk, Hakan Yalcin, Cyrus Bamji, A Time-Of-Flight Depth Sensor—System Description, Issues and Solutions, IEEE Computer Vision and Pattern Recognition Workshop, 2004.

A passive depth sensor is arranged to determine depth on the basis of ambient light and thus does not include or assume any specific characteristic of the light illuminating the scene. Specifically, the depth sensing may be based on no other assumption of the light than that there is sufficient light to allow (at least some) image objects to be differentiated in images captured of the scene. Specifically, the determination may be performed without any assumption of any spatial variation of the light illuminating the scene.

For example, in many embodiments, the passive depth sensor 105 may comprise two spatially offset cameras that capture images of the scene and seek to determine depth values by object detection in the images followed by disparity estimation. The object detection is simply based on the image content and matching of objects between the two images without considering any specific spatial characteristic of the light illuminating the scene.

Passive depth sensors do not tend to use a separate light source but instead typically depend solely on ambient light conditions. A well known technique is stereo disparity estimation where the apparent shift in position between objects in two spatially offset cameras is used to calculate depth. Another known technique uses a single camera but a modified aperture. This technique called coded aperture and can also be used to calculate depth.

Some active depth sensors may be based on time-of-flight estimation. Such approaches typically do not use a specific spatial illumination pattern. Rather, such time-of-flight approaches may often be based on the light source transmitting a specific light pulse (FM or otherwise) (and thus a temporal pattern) and the sensor being suitably configured to be able to convert the captured light to a depth reading.

Typically, active depth sensing is based on the depth determination assuming a spatial and/or temporal light pattern or characteristics. The active depth sensor 103 may accordingly comprise a light source generating such a spatial and/or temporal light pattern and may generate the depth map in response to the pattern. Indeed, in many embodiments, the apparatus may comprise an infrared light emitter and may be arranged to generate the depth values for the first depth map in response to measurements of infrared light. For example, the scene may be illuminated by an infrared light which creates an infrared pattern. This pattern is reflected by objects and the relative depths of the objects result in a distortion of the pattern. The active depth sensor 103 may then determine the depth estimates for the first depth map in response to the distortions in the pattern. As another example, an infrared signal may be generated and the time for reflections to be received back at the active depth sensor 103 may be estimated in different directions. The depth estimates may then be determined in response to these time-of-flight measurements.

In the system, the active depth sensor 103 and the passive depth sensor 105 are coupled to a combiner/depth map processor 107. The depth map processor 107 is arranged to generate an output depth map for the image by combining the first depth map and the second depth map.

In some embodiments, the first and second depth maps may be generated for the same view direction/with reference to the same coordinate system. As such, the depth map positions can directly be compared. Thus, in many embodiments, the view point differences between depth maps may be small (or indeed the depth maps may represent the same view point), and the positions in the depth maps may correspond directly to each other. Thus, in some embodiments, a depth pixel in one position in the first depth map and a depth pixel in the same position in the second depth map may (be considered to) directly correlate to the same position/direction in the scene. Thus, it can be assumed that the depth values in the same pixel positions in the depth maps relate to the same object and that accordingly they can directly be combined.

However, in many embodiments, generated depth maps may be referenced to different coordinate systems/viewpoints, i.e. they may comprise depth values relating to different viewpoints. Specifically, the depth maps may be acquired from different spatial locations and therefore each have their own camera coordinate system. In such a case, the first depth map and/or the second depth map may be generated from the original depth maps of the active and passive sensors by a view point shift such that the first depth map and the second depth map are provided for the same view point. Thus, the first depth map and the second depth map may be generated from the depth maps of the sensors such that they relate to the same coordinate system, and thus such that depth values at the same relative positions in the first and second depth maps are directly comparable and relate to the same positions/objects in the scene.

This can e.g. be done using knowledge of the camera locations and pre-calibration using a known depth pattern. In many embodiments, the view position adjustment between depth maps may be achieved by a view point shift being applied to one depth map such that it has the same view point as the other depth map. As another example, both depth maps may be shifted to have the same view point as the camera generating the image (which indeed may also correspond to a view point direction for especially the depth map generated by the passive sensor).

In some embodiments, the first depth map and the second depth map may relate to different viewpoints, for example the first depth map and the second depth maps may be depth maps generated directly by the active depth sensor 103 and the passive depth sensor 105 respectively. In such embodiments, the combination may be arranged to take into account the difference in viewpoints. For example, when selecting depth values to combine for one output depth value, the combination may include a horizontal offset for the depth value of one of the depth maps relative to the other depth map to reflect the view point offset.

In the following, references to positions in the depth maps may relate to corresponding positions in a shared coordinate system. The positions of depth values may specifically be referenced to a reference view point common for the first depth map and the second depth map (and to the image and/or the output depth map).

Specifically, corresponding or collocated positions may refer to the same pixel positions in the first depth map and second depth map for scenarios where these are referenced to the same view point/coordinate system. In scenarios where the first depth map and the second depth map are referenced to different coordinate systems or viewpoints, it may relate to different pixel positions in the depth maps that correspond to the same position in the shared coordinate system/view point.

The following discussion will for brevity and clarity focus on embodiments wherein the first depth map and the second depth map are referenced to the same coordinate system/view point, and where the same position in the depth maps accordingly refer to the same positions/directions/sight lines in the scene. However, it will be appreciated that this is not essential for the system and that compensation for different coordinate systems may be adopted in other embodiments.

The depth map processor 107 is arranged to determine the depth value at a given position in the output depth map by combining depth values at corresponding positions in respectively the first and second depth maps, and thus specifically to the same position in the shared coordinate system. Thus, the output depth map may be generated by combining the depth maps generated by respectively the active depth sensor 103 and the passive depth sensor 105. The output depth map accordingly may include depth values that have contributions from both the active and the passive depth sensing.

The combination may in some embodiments be a low complexity selection combining where e.g. the depth value for a given position of the output depth map is generated as either the depth value at that position in the first depth map or the depth value at that position in the second depth map.

In other embodiments, the depth value for a given position of the output depth map may e.g. be generated as a weighted combination of the depth value at that position in the first depth map and the depth value at that position in the second depth map. Thus, the depth values of the output depth map may include contributions from both the depth values of the first depth map and the second depth map.

In the system, the combination is dependent on a light indication which is indicative of a light characteristic for the scene, and specifically a light level for the scene. A light level may reflect an amount or intensity of light. The light level may be in a frequency range. For example, a visible light level may be a measure of an amount of electromagnetic radiation incident on a sensor in a frequency range of the visible spectrum (corresponding to a frequency range that is visible to humans). A visible light level may in some embodiments be a measure of an amount of electromagnetic radiation incident on a sensor in a frequency sub-range of the visible spectrum. For example, the visible light level may reflect an amount or intensity of light in a given color range. A visible light level may be a measure of an amount of electromagnetic radiation incident on a sensor in a frequency range of the infrared spectrum.

The light indication specifically comprises a first infrared light indication which is indicative of a characteristic of infrared light in the scene. Specifically, the infrared light indication is indicative of a level of infrared light in the scene, and specifically of the infrared illumination of the scene.

Thus, the light characteristic may specifically be an infrared light level and thus the light indication may in many embodiments comprise an infrared light indication which indicates a level of infrared light for the scene. The infrared light indication may be indicative of a degree of infrared illumination of the scene (e.g. by ambient or dedicated light sources). The infrared light indication may provide an indication of the amount of light that reaches the apparatus from the scene, and specifically may be a measure or estimate of the amount of infrared light (e.g. in a given frequency spectrum) that reaches one or both of the depth sensors.

Accordingly, the depth determining apparatus of FIG. 1 comprises a light determiner 109 which is arranged to determine a light indication for the scene where the light indication comprises a first infrared light indication that is indicative of an infrared light characteristic or property for the scene, and specifically is indicative of an infrared light level for the scene. The light determiner 109 is coupled to the depth map processor 107 which is provided with the light indication which is then used to adapt the combination of the first and second depth maps.

In the system, the light determiner 109 is arranged to estimate the first infrared light indication from a visible light indication which is determined for a frequency band in the visible light spectrum. Specifically, the light determiner 109 may measure a level of visible light (in a suitable frequency band in the visible light spectrum) and may then estimate a level of infrared light (in a suitable frequency band in the infrared light spectrum) from this visible light. This estimated light level may then be used as the infrared light indication, and indeed may be used directly as the light indication. Thus, in some embodiments, the light indication may only comprise a single parameter, namely the infrared light indication.

Thus, in the system, the combination of depth values of the first depth map and of the second depth map is dependent on the first infrared light indication which is determined as an estimate based on a visible light indication determined for a frequency band of the visible light spectrum.

The first infrared light indication may specifically be indicative of a property, and typically the level, of the infrared light of the scene during a time when no infrared illumination is provided for depth determination, e.g. at a time when no infrared pattern is transmitted and no infrared signals are generated for time of flight measurements. Rather, the first light indication may provide an indication of the infrared light level for the scene at times when the active depth sensor is not active (or rather the infrared illumination for depth sensing is not active). The first infrared light indication will accordingly also be referred to as the ambient light indication.

The ambient light indication may specifically reflect the amount of ambient infrared light present in the scene being captured. For example, for an outdoor scene of a beach or seaside in strong sunlight, the amount of infrared light is typically high and this may be reflected in the ambient light indication. In contrast, for an indoor scene of e.g. a living room, the infrared light indication may be relatively low. In the two situations, the infrared light which is generated by the active sensor when performing depth sensing and which is reflected back to the active depth sensor 103 from a foreground object (e.g. a person) may be the same. However, in such a case the ambient light indication may reflect the ambient infrared light level rather than the reflected infrared light.

The ambient light indication may for example in many scenarios be considered to reflect the interference to an active depth estimation which is based on the scene being actively illuminated by an infrared light. For example, in some embodiments, the active depth sensor 103 may transmit an infrared pattern with the depth estimation being determined in response to detected distortions of this pattern when reflected by objects in the scene. However, if there is a high level of ambient infrared light (e.g. due to a high amount of sunlight), the depth estimation may be less accurate as it may be more difficult to detect the specific pattern in the bright infrared image. However, determining an infrared light indication in response to visible light provides an estimate of this ambient light and this can accordingly be used to adapt the combination to reflect the degree of infrared ambient light.

The approach of estimating (ambient) infrared light based on measurements in the visible light spectrum has been found to result in accurate estimates in many typical scenarios. Furthermore, the approach allows the determination to be based on data, measurements, and/or functionality which is often present for other purposes. For example, it may be based on a standard light sensor and/or on data provided by a visible light camera, such as one used for the passive depth determination. Typically, passive infrared depth sensors, such as an infrared depth camera, do not provide any information on the infrared environment. Indeed, typical infrared active depth sensors at best provide a light indication which reflects the level of infrared when the depths sensing is being performed, i.e. when the scene is illuminated by the active infrared signal. Such an infrared sensor/camera does not allow any differentiation between desirable and interfering light, i.e. it does not allow any estimation of the effective signal to noise ratio for the depth determination. In many embodiments, the light determiner 109 comprises a visible light sensor which is arranged to measure the level of visible light from the scene.

As a low complexity example, the light determiner 109 may comprise a photo sensor which simply measures the overall light level for the scene, i.e. it may simply measure a level of the incident light on the photo sensor and this measure may be used to determine the light indication. The photo sensor may be arranged to measure the overall level of visible light and may thus provide a good indication of e.g. whether the current image is captured for a scene reflecting bright outdoor sunlight, twilight, an indoor darkened room etc. Further, an infrared light indication may be determined from the visible light indication. For example, a proportionality factor may be used such that an infrared level is considered to be a predetermined fraction of the determined visible light level.

Indeed, in many embodiments, the infrared light level may be determined as a monotonically increasing function of the measured visible light level. The function may typically be a predetermined function. For example, in a low complexity embodiment, the infrared light indication may be given as an infrared light level estimated as a predetermined fraction of the measured visible light level.

In such a scenario, the depth map processor 107 may be arranged to combine the first depth map and second depth map based on this indication of overall infrared light level.

For example, when the light indication indicates that the scene is very bright, the depth values from the second depth map, i.e. the depth values generated by the passive depth sensor 105, may be weighted very highly whereas the depth values from the first depth map, i.e. from the active depth sensor 103, may have low weights. If instead the light indication indicates that the scene is very dark, the depth values from the first depth map, i.e. the depth values generated by the active depth sensor 103, may be weighted very highly whereas the depth values from the second depth map, i.e. from the passive depth sensor 105, have low weights. Indeed, in some embodiments, selection combining may be used where the depth map processor 107 selects the depth values of the first depth map when the light indication indicates a light level below a given threshold and the depth values of the second depth map when the light indication indicates a light level above the given threshold.

Such an approach may thus reflect that when the visible light level is high, it is likely that the passive depth sensor (e.g. a visible light stereo camera) may operate in benign conditions. At the same time, the infrared light level may be very high (e.g. it may indicate bright sunshine which causes bright illumination in both the visible and the infrared range). Thus, although the scene may provide high infrared reflectivity and thus a bright reflected infrared pattern (or other signal) from the active illumination, the presence of the high level of ambient infrared light may result in the signal to noise ratio for the pattern detection being very low, and thus in a relatively inaccurate active depth determination. In contrast, for low visible light, the passive depth sensor is unlikely to perform well whereas the active depth sensor may perform well as there is no interference to the generated active infrared light from ambient infrared light.

The system may accordingly dynamically combine depth values from an active depth sensor 103 and a passive depth sensor 105 based on the lighting of the scene. This may substantially improve the generated depth map and may in particular provide a depth determining apparatus which can provide useable depth maps for a significantly larger range of capture environments.

In many embodiments, the apparatus, and specifically the active depth sensor 103, may comprise an infrared light emitter and may be arranged to generate the depth values for the first depth map in response to measurements of infrared light. Further, the passive depth sensor 105 may comprise at least one visible light camera and be arranged to generate the depth values for the second depth map in response to measurements of visible light. Specifically, the passive depth sensor 105 may comprise a stereo camera with two spatially offset cameras capturing visible light to generate images.

Figure 2:
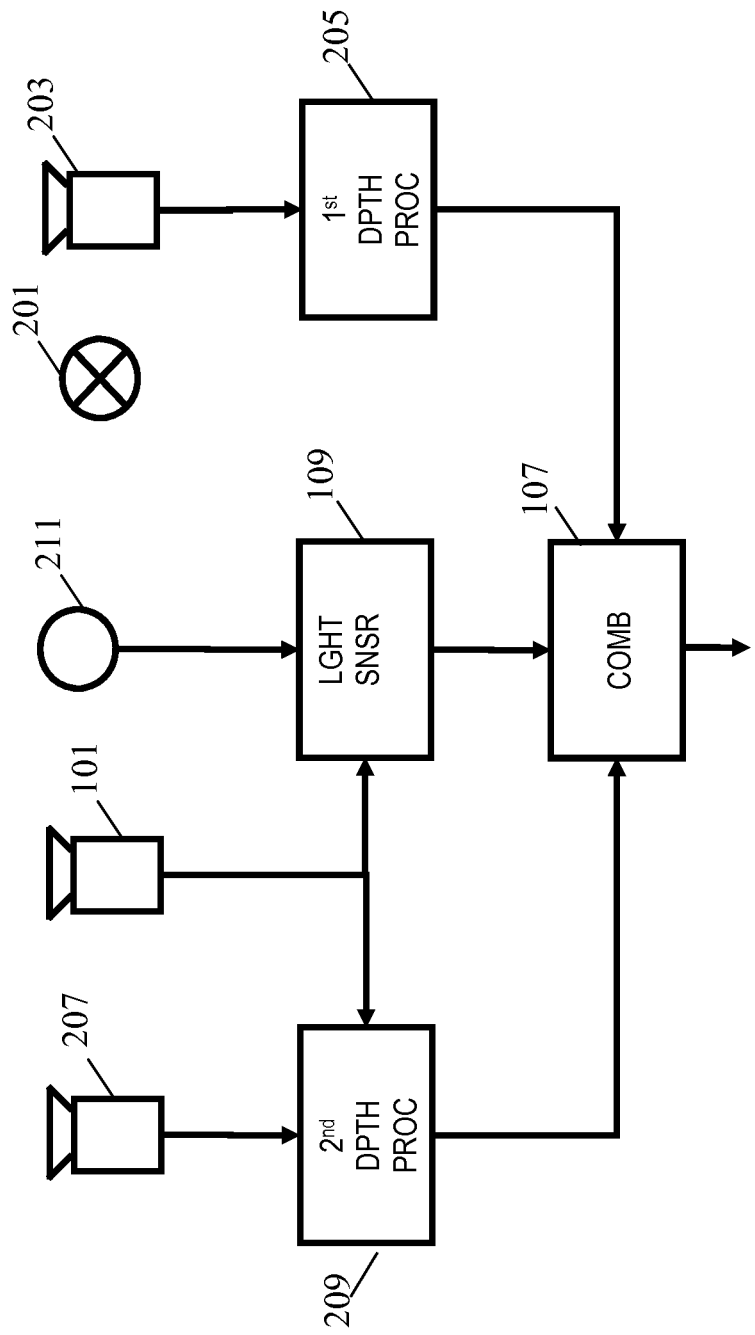
FIG. 2 is an illustration of an example of elements of an apparatus for determining a depth map in accordance with some embodiments of the invention.

FIG. 2 illustrates an example of such an embodiment.

In the example, the passive depth sensor 105 comprises an infrared light emitter 201 which emits infrared light and which specifically emits a pattern of infrared light. The passive depth sensor 105 further comprises an infrared camera 203 which is arranged to capture the infrared light from the scene, and which specifically can record the emitted light pattern as reflected from objects of the scene.

The infrared camera 203 is coupled to a first depth processor 205 which is arranged to generate the depth values for the first depth map based on the images received from the infrared camera 203.

For example, the first depth processor 205 may be arranged to determine the depth values for different parts of the image in response to a comparison of the detected infrared light pattern to knowledge about the projected pattern. Thus, distortions and deviations in the pattern may be used to determine the depth values. As another example, the infrared camera 203 may be a stereo camera and the first depth processor 205 may be arranged to determine depth values from estimated disparities of corresponding parts of the pattern in the two images generated by the infrared camera 203.

The passive depth sensor 105 comprises a stereo camera which is arranged to capture a scene in two simultaneous images from different view directions. In the example, the stereo camera comprises two spatially offset visible light cameras of which one camera 101 is also providing the image for which the depth map is determined. Thus, the image captured by the first camera 101 (corresponding to the visible light camera 101 of FIG. 1) is not only the output image for which a depth map is generated but is also used by the passive depth sensor 105 to determine the second depth map. In the example, the stereo camera further comprises a second visible light camera 207 capturing an image at the same time as the first camera 101. The two cameras may be identical spatially offset cameras.

The images captured by the two visible light cameras 101, 207 are fed to a second depth processor 209 which is arranged to generate depth values for the image from the first camera 101 by disparity estimation between the two received images. The second depth processor 209 may specifically seek to identify corresponding image objects in the two images and to determine the depth for such an object from the relative offset in the position of the image objects in the two images, i.e. from the disparity. Thus, the depth determination of the passive depth sensor 105 is not based on specific assumptions or knowledge of the illumination of the scene.

In contrast to the active depth sensor 103 which performs depth determination based on an active illumination of the scene, the passive depth sensor 105 determines depth on the basis of the ambient lighting of the scene.

In some embodiments, the light determiner 109 may comprise a light sensor 211 which simply measures the general overall light level for the scene.

In many embodiments, the measured light may be a measure of the level of visible light in the scene. Thus, the light indication may include an infrared light indication determined on the basis of a visible light indication, and specifically based on a visible light measurement. In many embodiments, the light indication may further include the visible light indication, i.e. the light indication may be a composite light indication comprising both a visible light indication and an infrared light indication.

The visible light indication may be determined for a frequency band of the visible light spectrum. The frequency band may comprise the whole of the visible light spectrum or may e.g. be only a subrange of the visible light spectrum. In many embodiments, the light sensor 211 may simply be a sensor which has an increased sensitivity to visible light than to light outside of the visible spectrum, and accordingly may provide a light measurement that reflects the visible light illumination of the scene, i.e. it may automatically provide a visible light indication.

The depth map processor 107 may combine the first and second depth maps based on the light indication. As an example, the depth map processor 107 may select the first depth map if the light indication indicates that the ambient infrared light level is below a given level and may select the second depth map otherwise. In many embodiments, a selection combination may be performed by selecting one of the depth maps in response to whether the ambient infrared light indication is above or below a threshold.

In other embodiments, the output depth values may be generated by a weighted combination of the values for the first and second depth maps where the weighting is dependent on the ambient infrared light indication. Specifically, the output depth values may be calculated as a weighted summation of the depth values of the first and second depth maps, e.g.:

$$d_{out}(x,y)=\alpha \cdot d_2(x,y)+(1-\alpha)d_1(x,y),$$

where $d_1(x,y)$ and $d_2(x,y)$ are the depth values of the first and second depth map at position x and y respectively, and $\alpha$ is the visible light indication provided as a normalized (in the interval of [0;1]) value indicating the amount of visible light detected (with higher values indicating higher light levels).

In many systems, such as that described above, the weighting of depth levels of the second depth map relative to depth levels of the first depth map is increased for the ambient infrared light indication being indicative of an increasing level of infrared light. For example, it may be assumed that the amount of emitted infrared light that is reflected is relatively constant. The amount of ambient infrared light may accordingly directly be used as a signal to noise ratio for the active depth sensor 103. This may be reflected in the above combination. The higher the ambient infrared light level, the lower the signal to interference or noise for the captured infrared image by the active depth sensor 103, and thus the lower the weighting of the first depth map values.

In some embodiments, the light determiner 109 may determine the light indication to further include a second indication of the infrared light in the scene when the scene is illuminated for active depth determination, and specifically of the level of infrared light in the scene when this is illuminated by the apparatus. Such an indication will in the following be referred to as an active infrared light indication Thus, the light indication may comprise an active infrared light indication.

Indeed, the active infrared light indication may be considered to be an indication of the infrared "signal" (or signal plus interference) for the active depth determination and the ambient infrared light indication may be considered an indication of the interference to the active depth determination. The combined information provided by the active infrared light indication and the ambient infrared light indication may thus provide a very good indication of the depth sensing performance of the active depth sensor 103 (it indicates the signal to interference ratio). Accordingly, the combination of the first and second depth maps may be in response to both the ambient infrared light indication and the active infrared light indication.

The active infrared light indication may be determined for a frequency band of the infrared light spectrum, and specifically by a direct measurement of the infrared light in the infrared light spectrum during a time when the scene is illuminated, and typically during a time when the active depth determination is actually being performed. The frequency band may comprise the whole of the infrared light spectrum or may e.g. be only a subrange of the infrared light spectrum. In many embodiments, the light sensor 211 may be or include an infrared sensor which has an increased sensitivity to infrared light than to light outside of the infrared spectrum, and accordingly may provide a light measurement that reflects the infrared light illumination of the scene, i.e. it may automatically provide an infrared light indication.

The depth map processor 107 may combine the first and second depth maps based on both the ambient infrared light indication and the active infrared light indication. As an example, the depth map processor 107 may select the first depth map if the ratio between the active infrared light indication and the ambient infrared light indication is above a given level and may select the second depth map otherwise.

In other embodiments, the output depth values may be generated by a weighted combination of the values for the first and second depth maps where the weighting is dependent on both the active infrared light indication and the ambient infrared light indication. Specifically, the output depth values may be calculated as a weighted summation of the depth values of the first and second depth maps, e.g.:

$$d_{out}(x,y)=\beta \cdot d_1(x,y)+(1-\beta)d_2(x,y),$$

where $d_1(x,y)$ and $d_2(x,y)$ are the depth values of the first and second depth map at position x and y respectively, and $\beta$ is a value generated based on both the active infrared light indication and the ambient infrared light indication (e.g. a difference or ratio between these) s a normalized (in the interval of [0;1]) value indicating the infrared light signal to noise ratio.

In many systems, such as that described above, the weighting of depth values of the first depth map relative to depth values of the second depth map is increased for the infrared light indication indicative of an increasing level of active infrared light level relative to ambient infrared light level. At the same time, the weighting of depth levels of the first depth map relative to depth levels of the second depth map may be decreased for the infrared light indication being indicative of an increasing level of the ambient infrared light indication. Such an approach may provide an effective response to variations in the effective signal to interference ratio for the active depth determination. For example, the depth map processor 107 may be arranged to determine a difference infrared light indication e.g. by subtracting the ambient infrared light indication from the active infrared light indication. The weight(s) for the first depth map, i.e. for the depth values determined by the active depth sensor 103, may then be determined as a monotonically increasing function of this difference indication (and the weight(s) for the second depth map as a monotonically decreasing function of this difference indication).

An approach wherein the combination is based on both an active infrared light indication and an ambient infrared light indication may provide particularly efficient operation in many embodiments. Specifically, it may in many applications allow existing off-the-shelf equipment to be used. Indeed, most generally available active depth sensors provide an indication of the infrared light level when depth sensing is performed, i.e. many existing active depth sensors, such as infrared based cameras, can directly provide an indication of the active light situation. This data can directly be used as an active infrared light indication, or such an active infrared light indication can be determined therefrom.

However, basing the combination only on such information may be inefficient in many scenarios. For example, in very bright sunlight, the ambient light level is typically very high. Thus, when the scene is illuminated by the active light sensor and the active depth sensing is performed, the total infrared light level is very high and this will be reflected by the active depth sensor indicating a high level. However, it is not possible for the apparatus to determine whether such a high infrared light level is due to beneficial conditions of high level reflections or is indicative of poor conditions due to high interference light levels. Thus, by performing the combination based only this active infrared light indication, the risk of erroneous or at least suboptimal combination resulting in a degraded depth map is high. Unfortunately, no other information is typically available from a typical standard active depth sensor.

However, in the described system, an ambient infrared light indication is further generated, and specifically is generated during a time when no illumination of the scene is performed in order to perform and active depth sensing. This allows the system to differentiate between the different scenarios described in the previous paragraph, and accordingly allows the combination to be improved. Further, the ambient infrared light indication is determined on the basis of visible light measurements which are typically generated by functionality that is already available. In particular, the ambient infrared light indication may be determined based on the passive depth sensor 105 which for example may be a visible light camera. Thus, an improved combination may be achieved resulting in an improved depth map being generated. Furthermore, this may be achieved while allowing standard functionality, and indeed typically off-the-shelf depth sensors (both active and passive).

In many embodiments, the apparatus may be arranged to generate the light indication to comprise both a visible light indication and one or more infrared light indications. For example, the light sensor 209 may be arranged to measure light in a frequency band of the visible light spectrum and to estimate the light in a frequency band of the infrared light spectrum from this visible light, i.e. it may determine both a visible light indication and an ambient infrared light indication. In addition, the active depth sensor 103 may determine an active infrared light indication.

The light indication may be generated to comprise a plurality of values where one indicates the level of light in the visible light frequency band, another indicates the level of light in the infrared frequency band when no depth sensing infrared illumination is performed, and another value indicates the level of light in an infrared frequency band when depth sensing infrared illumination is performed. Thus, the light indication may include both a visible light indication, the active infrared light indication, and the ambient infrared light indication.

Thus, in many embodiments, a light indication may comprise both a visible light indication and an infrared light indication where the visible light indication has a higher dependency on light properties within the visible frequency range than the infrared light indication and the infrared light indication has a higher dependency on light properties within the infrared frequency range than the visible light indication.

In such embodiments, the combination may furthermore be dependent on both the visible light indication and the infrared light indication. For example, both values could be compared to thresholds and the combination approach could be adjusted accordingly.

E.g. (assuming the indications are given as a single value which has an increasing value for an increasing light level) if the visible light indication is above a first threshold and the infrared light indication is below a second threshold, the second depth map may be used. If the visible light indication is below a first threshold and the infrared light indication is above the second threshold, the first depth map may be selected. For other values of the infrared light indication and the visible light indication, the output depth map may be generated by averaging the depth values of the first depth map and the second depth map.

As another example, a weighted combination based on both the visible light indication and the ambient infrared light indication may be used by the depth map processor 107. As a specific example, the output depth values may be calculated as:

$$d_{out}(x, y) = \frac{\alpha \cdot d_2(x, y) + (1-\alpha)d_1(x, y) + \beta \cdot d_1(x, y) + (1-\beta)d_2(x, y)}{2}.$$

It will be appreciated that many other equations and functions can be used for performing weighted combinations in different embodiments, and that many other equations and functions can be used for determining the individual weights depending on the preferences and requirements of the individual embodiment.

The apparatus may generate an output depth map which is more accurate in many scenarios. Specifically, the apparatus may be suitable for determining depth maps in a wider range of operating scenarios. Indeed, the Inventors have realized that improved depth map generation and adaptation to the application scenario can be achieved by combining active depth sensing with passive depth sensing based on light characteristics for the scene.

The apparatus of FIG. 2 provides a hybrid system, in which both an active depth sensing with an infrared light source and a passive stereo camera (disparity estimation) is combined to provide improved performance by exploiting characteristics of the different modalities used for depth sensing. The system will in most scenarios substantially outperform conventional systems based either on active depth sensing or passive depth sensing.

In many of the embodiments described above, the light indication is generated at least partly based on measurements from a dedicated light sensor. However, in many embodiments, the system may use the data from one or both of the cameras to generate the light indication. Specifically, in many embodiments, the light determiner 109 may be coupled to the camera 101 and be arranged to generate the light indication (and specifically the ambient infrared light indication) in response to this data.

As described, the first camera 101 is a visible light camera which is also used to generate the output image, and indeed the output image is also used by the passive depth sensor 105 for depth disparity. However, it will be appreciated that the camera used to generate the light indication need not also be used for generating the output image or be used as part of the passive depth determination. Nevertheless, in many embodiments the complexity reduction and synergistic effect of using the same camera for multiple purposes may be highly advantageous. For example, it may provide that the light indication provides a very accurate reflection of the light captured in the image used for the depth sensing, and thus provide a very accurate indication of the depth sensing performance that can be achieved based on this image. It may further provide a capture of a full visible spectrum which may provide an advantageous indication of the ambient infrared light.

The first camera 101 is in the system of FIG. 2 a visible light camera and accordingly the data from the camera is used to generate a visible light indication. This is then used to generate the infrared light indication.

In some embodiments, a global visible light indication may be generated, and specifically a single value indicating the level of visible light may be generated.

In some embodiments, the visible light indication, and thus the ambient infrared light indication, may be generated in response to the exposure settings/values used by the first camera 101 when capturing the image.

Specifically, in some embodiments, the visible light indication may be generated in response to the image capture duration used by the first camera 101 when capturing the image. The image capture duration may e.g. be determined based on the integration time for the image sensor of the first camera collecting light. Thus, in particular, the visible light indication may be generated based on the shutter time for the camera, and indeed may in some embodiments be generated directly as the shutter time.

Similarly, in some embodiments the visible light indication may be generated in response to the aperture used by the first camera 101 when capturing the image. The aperture may e.g. be provided to the light determiner 109 as an f-stop value indicating the opening of the lens.

In many embodiments, the light determiner 109 may be arranged to determine the visible light indication as a function of both the capture duration and the aperture. E.g. it may comprise a look-up table which for various combinations of shutter times and apertures provide a light level value that can be used as the visible light indication.

Such approaches may be particularly suitable for cameras employing automatic exposure functionality. Such approaches may seek to adjust the aperture, shutter time, or both to generate an image having a given exposure such as for example an average exposure for the image. The shutter and aperture that are selected may accordingly provide a good indication of the overall light level of the scene.

In some embodiments, the visible light indication may alternatively or additionally be determined in response to image data values of the captured image (e.g. the output image or an image used for depth sensing).

Specifically, the visible light indication may be determined in response to pixel values of the captured image.

In some embodiments, a global visible light indication may be generated that is used for the entire image. For example, the light determiner 109 may be arranged to determine the average pixel value and use this as a visible light indication.

In some embodiments, the image data may be combined with the exposure values i.e. with the capture time and/or the aperture. For example, based on the shutter time and the f-stop, the light determiner 109 may perform a table look-up to determine an initial light level estimate. This value may then be multiplied by the average pixel value (e.g. normalized to the range of [0;1]) to provide an estimate of the visible light level for the scene.

In other embodiments, the visible light indication may be generated without considering the exposure values. For example, the average pixel value may be used directly as the visible light indication. Such an indication may provide a less accurate indication of the illumination of the scene for differing exposures but may provide a more accurate indication of the exposure of the image, and thus may provide a more accurate indication of how a depth estimation based on this image may perform. In other words, the visible light indication may in such an approach take into account and compensate for the exposure settings such that the impact of these on the captured image are also reflected in the visible light indication.

The ambient infrared light indication may then be determined from the visible light indication, and thus the ambient infrared light indication can be determined from the information provided by the first camera 109. Furthermore, in the example, the ambient infrared light indication is determined from information that is normally provided by a standard camera, namely from exposure information (aperture, shutter speed) as well as the captured image data. Thus, the approach may allow a standard camera to be used.

Indeed, a particular advantage of the approach is that it may in many embodiments allow standard off-the-shelf active and passive depth sensors to be used while allowing an improved output depth map to be generated.

In the previous examples, the generated light indication is a global light indication, i.e. it applies to all areas of the image. However, in some embodiments, the system may be arranged to generate light indications that vary for different parts of the image. The light indication values for different regions may in the following be referred to as local light indications or local light indication values.

In some embodiments, the visible light indication, and thus the ambient infrared light indication, may accordingly comprise different values for different regions of the image. Thus, the light indication is generated to comprise individual light indication values for different regions of the image. These local light indication values may then be used in each region to perform the combination of the depth values of the first depth map and the second depth map. Thus, the depth map processor 107 may combine depth values for each individual region in response to a light indication value of the individual region.

Indeed, in many embodiments, the light determiner 109 may be arranged to generate a separate light indication value for each pixel. In some embodiments, each normalized pixel value may even be used directly as a visible light indication value, and thus the light indication may be provided as a map of values having the same resolution as the image and depth maps. In other embodiments, a light indication map may be generated with a lower resolution than the image. The values of this lower resolution map may e.g. be generated by averaging pixel values within image blocks corresponding to the desired resolution. This may e.g. be particularly suitable for embodiments wherein the first and/or second depth map has a lower resolution than the image.

It will be appreciated that in some embodiments, the local visible light indication values may be generated based on other or additional parameters than just the image data values (pixel values). For example, visible light indication values may be calculated for each individual pixel by multiplying the pixel value by the shutter time and aperture value (e.g. followed by a normalization).

In such embodiments, the combination may thus be locally adapted. For example, the depth value for each pixel may be selected from the depth maps dependent on whether the ambient infrared light indication determined from the visible light indication is above or below a threshold. Similarly, the depth values may be determined based on a weighted combination using weights that are determined for the individual region, and specifically for the individual pixel.

For example, the output depth values may be generated as:

$$d_{out}(x,y)=\alpha(x,y)\cdot d_2(x,y)+(1-\alpha(x,y))d_1(x,y).$$

In embodiments where the combination is dependent on both an ambient infrared light indication and an active infrared light indication, both of these indications may have spatial variations (i.e. be local values) or e.g. only one of them may be different for different regions.

For example, the output depth values may be calculated based on local ambient infrared light indication values and a global active infrared light indication value, such as e.g. in $$d_{out}(x, y) = \frac{\alpha(x, y)\cdot d_2(x, y) + (1 - \alpha(x, y))d_1(x, y) + \beta\cdot d_1(x, y) + (1 - \beta)d_2(x, y)}{2},$$

or it may e.g. be calculated based on both local ambient infrared light indication values and active infrared light indication values, such as in:

$$d_{out}(x, y) = \frac{\alpha(x, y)\cdot d_2(x, y) + (1 - \alpha(x, y))d_1(x, y) + \beta(x, y)\cdot d_1(x, y) + (1 - \beta(x, y))d_2(x, y)}{2}.$$

The locally adapted generation of depth values may provide improved performance in many scenarios, and specifically may provide a more accurate depth map. For example, it may in contrast to conventional approaches in many scenarios provide accurate depth values for both bright areas as well as for dark areas. For instance in very bright (sunny) outdoor light conditions, the visible light stereo camera of the passive depth sensor 105 may be used to provide depth values for all image pixels except for those that are in a shadow region where the depth values are obtained from the output of the active depth sensor 103.

In some embodiments, such as described above, the apparatus may comprise a dedicated infrared light sensor which is used to determine values for the active infrared light indication. The infrared light sensor may e.g. be a single sensor measuring the general infrared light level or may e.g. be an infrared light camera—and may specifically be an infrared light camera also used to determine depth values (e.g. from distortions in a detected pattern).

However, in the system of FIGS. 1 and 2, the apparatus is arranged to generate the ambient infrared light indication in response to measurements by a visible light camera. Specifically, the apparatus arranged to generate the infrared light indication in response to an estimation of the infrared light level based on measurements in the visible light spectrum.

For example, in many embodiments, the first camera 101 may include an infrared attenuation filter which attenuates light in the infrared range relative to light in the visible range. This may provide improved images in many scenarios. Indeed, in many embodiments, the first camera 101 may comprise an infrared blocking filter which reduces the infrared signal levels to insignificant values in comparison to the levels of visible light.

However, the light determiner 109 may be arranged to estimate the infrared level from the measurements of the levels in the visible range. In some embodiments, the light determiner 109 may for example estimate the ambient infrared light level as a function of the visible light level. Typically, the higher the amount of visible light, the higher the amount of the infrared light (e.g. a sunny day compared to twilight on a cloudy day). This estimate may e.g. be compared to a power of the emitted infrared light to generate an infrared light indication providing an estimate of the signal to noise ratio of an infrared light pattern captured by the active depth sensor 103.

The light determiner 109 may specifically determine the infrared light indication based on the image data from the first camera 101. In many embodiments, the image data as previously described provides a measure of the light incident on the individual pixels. Accordingly, the pixel values can be used to estimate the infrared light.

In some embodiments, the light determiner 109 may be arranged to determine the infrared light indication in response to a comparison of the output of different cameras having different attenuation of infrared light. For example, the first camera 101 may not include any infrared attenuation filter whereas the second visible light camera 207 may include an infrared blocking filter.

Thus, the second visible light camera 207 may capture only visible light whereas the first camera 101 also captures infrared light (such as e.g. from an infrared light pattern emitted from the active depth sensor 103). The infrared light indication may then be calculated as the difference between the values for the two cameras.

Further, the light determiner 109 may proceed to consider only a subset of the color channels when performing this estimation. For example, the infrared light may predominantly affect the R channel and accordingly only this channel may be considered. Further, in this case, the other channels (i.e. specifically the G and B channels) may be relatively unaffected by the infrared light and therefore the depth estimation by the passive depth sensor 105 may be based only on these channels. Thus, assuming that the G and B channels are largely unaffected by infrared light, these channels could be used for disparity matching whereas the R red channel may be used for infrared based depth estimation (e.g. using the infrared pattern) by the active depth sensor 103.

Indeed, in some embodiments, the light determiner 109 may be arranged to determine the infrared light indication from the image data of the first camera 101 by considering individual color channels of the generated image. Specifically, the light determiner 109 may be arranged to estimate the infrared light indication from image data in response to a comparison of image data of a first subset of color channels of the image captured by the visible light camera relative to image data of a second subset of color channels of the image captured by the visible light camera.

One subset of color channels may comprise one or more color channels corresponding to frequencies closer to the infrared range than for the color channel or channels in the other color channel subset. Such an approach may provide two values corresponding to measurements in different frequency bands. It is likely that there is a closer correlation between light levels in the infrared range and light levels in the frequency band closest to the infrared range than between light levels in the infrared range and light levels in the frequency band further from the infrared range. Also, in practice the sensitivity of the color channel closest to the infrared range tends to also stretch into to this range, e.g. the frequency response of Red pixels tend to include at least part of the infrared range. Accordingly, comparing the level in the first frequency band to the second may provide a more accurate estimation of the light levels of the infrared spectrum.

As an example, the first camera 101 may be an RGB camera and the light determiner 109 may generate the infrared light indication by considering pixel values for the Red channel in comparison to the pixel values in the Green and Blue channels (e.g. the average value may be used).

It may e.g. be assumed that the G and B pixel values are independent of infrared light whereas the R pixel values is likely to reflect the combined level of both visible light only sources as well as sources emitting both infrared and visible light (and indeed the frequency response of the R channel may include at least part of the infrared spectrum). A possible approach may then be to generate the infrared light indication as the difference between the R pixel value and the average G and B pixel values.

In some embodiments, the approach may further be enhanced by having an infrared attenuation filter which has different attenuations of infrared light for at least one color relative to at least one other color channel.

Specifically, the infrared attenuation filter may have higher infrared attenuation for at least one color channel of the second subset relative to at least one color channel of the first subset. By having a lower attenuation of infrared light for one or more color channels corresponding to frequency bands close to the infrared spectrum than for one or more color channels corresponding to frequency bands further from the infrared spectrum, the separation and differentiation between light sources emitting light in both the infrared and (part of the) visible spectrum and light sources emitting light only in the visible spectrum can be increased.

In some embodiments, the combination of the first depth map and the second depth map may not only consider the light indication but may also consider other factors.

For example, in embodiments wherein the passive depth sensor 105 comprises a stereo camera and determines the second depth from a disparity estimation using a stereo image, the light determiner 109 may further be arranged to determine a spatial uniformity indication for the stereo image. The combination may then be performed in response to this spatial uniformity indication.

Indeed, disparity estimation tends to function better for areas wherein there is substantial variation in the image rather than for large flat areas. Therefore, a spatial uniformity indication may provide a good indication of the relative performance of the passive depth sensor 105 and therefore improved performance can be achieved by e.g. weighting the second depth map differently with respect to the first depth map depending on this spatial uniformity indication.

For example, the depth map processor 107 may be arranged to increase the weighting of depth values of the second depth map relative to depth values of the first depth map for the spatial uniformity indication indicating a decreased degree of spatial uniformity.

The spatial uniformity indication may for example be determined as the local variance in a neighborhood of pixels. In particular, it may be determined as the horizontal variation in a neighborhood of pixels, which can be calculated e.g. as the sum of absolute differences in luminance values between horizontally neighboring pixels. It may also be determined as the difference between the maximum and minimum luminance in a neighborhood of pixels.

As another example, in some embodiments, the passive depth sensor may comprise a visible light camera which comprises auto-focus functionality, i.e. the camera may be a visible light auto-focus camera. In such a case, the auto-focus may provide an indication of the focal distance which in some embodiments may be used to adapt the combination.

For example, the active depth sensor 103 may typically function better for objects that are relatively close than for objects that are at long distances (e.g. due to the reducing in reflected infrared light). The auto-focus distance may provide an indication of the general distance to the objects and may thus provide an indication of the relative accuracy and reliability of the depth values generated by respectively the active depth sensor 103 and the passive depth sensor 105.

The depth map processor 107 may specifically be arranged to increase the weighting of depth values of the second depth map relative to depth values of the first depth map for the focal distance indication indicating an increased auto-focus distance.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An apparatus, comprising:
    an active depth sensor, wherein the active depth sensor is arranged to determine a first depth map for an image of a scene, wherein the first depth map comprises first depth values for pixels of the image, wherein the first depth values are determined by the active depth sensor;
    a passive depth sensor, wherein the passive depth sensor is arranged to determine a second depth map for the image, wherein the second depth map comprises second depth values for the pixels of the image, wherein the second depth values are determined by the passive depth sensor;
    a light determiner circuit, wherein the light determiner circuit is arranged to determine a first infrared light indication, wherein the first infrared light indication is indicative of an ambient infrared light level for the scene;
    a depth map processor circuit, wherein the depth map processor circuit is arranged to determine an output depth map for the image by combining the first depth map and the second depth map,
    wherein the depth map processor circuit is arranged to determine third depth values for the output depth map as a combination of the first depth values and the second depth values,
    wherein the combination is dependent on the first infrared light indication,
    wherein the light determiner circuit is arranged to determine a visible light indication and to estimate the first infrared light indication from the visible light indication, and
    wherein the visible light indication is indicative of a light level in a frequency band of the visible light spectrum.

2. The apparatus of claim 1,
    wherein the ambient infrared light level is indicative of a level of infrared light when no infrared light is emitted by the apparatus.

3. The apparatus of claim 1, wherein the light determiner circuit is arranged to generate the visible light indication based on data from a visible light camera.

4. The apparatus of claim 3, wherein the data comprises an image capture duration for capturing the image of the scene.

5. The apparatus of claim 3,
    wherein the data comprises the image captured by the visible light camera,
    wherein the light determiner circuit is arranged to determine the visible light indication in response to image data values of the image captured by the visible light camera.

6. The apparatus of claim 1, wherein the light determiner circuit is further arranged to determine a second infrared light indication determined in response to a light measurement in a frequency band of the infrared light spectrum.

7. The apparatus of claim 6, wherein the second infrared light indication is indicative of an infrared light level when the scene is illuminated.

8. The apparatus of claim 7, wherein the first infrared light indication is indicative of an infrared light level when the scene is not illuminated.

9. The apparatus of claim 7,
    wherein the depth map processor circuit is arranged to decrease a weighting of the first depth values relative to the second depth values when the first infrared light indication is indicative of an increasing level of infrared light, and
    wherein the depth map processor circuit is arranged to increase a weighting of the first depth values relative to the second depth values when the second infrared light indication is indicative of an increasing level of infrared light.

10. The apparatus of claim 1,
    wherein the image comprises a plurality of regions,
    wherein the first infrared light indication comprises individual first infrared light indication values for different regions of the image,
    wherein the depth map processor circuit is arranged to combine first depth values and second depth values for each individual region in response to a corresponding first infrared light indication value of each region.

11. The apparatus of claim 1 wherein the depth map processor circuit is arranged to increase a weighting of the second depth values relative to the first depth values when the first visible light indication is indicative of an increasing level of visible light.

12. The apparatus of claim 1,
    wherein the passive depth sensor comprises at least one visible light camera, wherein the visible light camera is configured to capture image data,
    wherein the light determiner circuit is arranged to determine the first infrared light indication in response to a comparison of the image data of a first subset of color channels captured by the visible light camera relative to the image data of a second subset of color channels captured by the visible light camera.

13. The apparatus of claim 1, wherein the depth map processor circuit is arranged to determine a combination weighting of the first depth values relative to the second depth values in response to both the visible light indication and the first infrared light indication.

14. A method, comprising:
    determining a first depth map for an image of a scene, wherein the first depth map comprises first depth values for pixels of the image determined by an active depth sensor;
    determining a second depth map for the image, wherein the second depth map comprises second depth values for the pixels of the image determined by a passive depth sensor;
    determining a visible light indication, wherein the visible light indication is indicative of a light level in a frequency band of the visible light spectrum;
    estimating a first infrared light indication from the visible light indication, wherein the first infrared light indication is indicative of an ambient infrared light level for the scene;
    determining an output depth map for the image by combining the first depth map and the second depth map,
    wherein the determining of the output depth map comprises determining a depth value for the output depth map as a combination of the first depth values and the second depth values, and
    wherein the combination is dependent on the first infrared light indication.

15. A computer program product comprising a non-transitory data storage media having stored thereon computer program code, wherein the computer program code is arranged to perform the method of claim 14 when the computer program code is executed by a processor.

16. The method of claim 14,
wherein the ambient infrared light is indicative of a level of infrared light when no infrared light is emitted by the apparatus.

17. The method of claim 14, wherein the visible light indication is determined based on data from a visible light camera.

18. The method of claim 17, wherein the data comprises an image capture duration of the visible light camera capturing the image of the scene.

19. The apparatus of claim 17,
wherein the data comprises the image captured by the visible light camera,
wherein determining the visible light indication is in response to image data values of the image captured by the visible light camera.

20. The method of claim 14, further comprising determining a second infrared light indication in response to a light measurement in a frequency band of the infrared light spectrum.

* * * * *